(12) United States Patent
Tokai et al.

(10) Patent No.: US 6,969,292 B2
(45) Date of Patent: Nov. 29, 2005

(54) METHOD FOR FORMING PHOSPHOR LAYER OF GAS DISCHARGE TUBE AND METHOD FOR FABRICATING PHOSPHOR LAYER SUPPORTING MEMBER

(75) Inventors: Akira Tokai, Kawasaki (JP); Hitoshi Yamada, Kawasaki (JP); Manabu Ishimoto, Kawasaki (JP); Tsutae Shinoda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 4 days.

(21) Appl. No.: 10/760,490

(22) Filed: Jan. 21, 2004

(65) Prior Publication Data

US 2004/0152389 A1 Aug. 5, 2004

Related U.S. Application Data

(63) Continuation of application No. PCT/JP02/09385, filed on Sep. 12, 2002.

(30) Foreign Application Priority Data

Sep. 14, 2001 (JP) .............................. 2001-280187

(51) Int. Cl.[7] .............................. H01J 9/00; B05D 5/06
(52) U.S. Cl. .............................. 445/24; 445/12; 445/14; 427/64; 427/67
(58) Field of Search .............................. 445/24, 25, 12–14, 445/22; 427/64, 67; 313/582, 587, 635, 609, 313/573, 484, 485

(56) References Cited

U.S. PATENT DOCUMENTS

| | | | | |
|---|---|---|---|---|
| 3,602,754 A | * | 8/1971 | Pfaender et al. | 313/586 |
| 5,164,633 A | * | 11/1992 | Kim et al. | 313/581 |
| 6,156,141 A | * | 12/2000 | Shirakawa | 156/67 |
| 6,612,889 B1 | * | 9/2003 | Green et al. | 445/24 |

FOREIGN PATENT DOCUMENTS

| | | |
|---|---|---|
| JP | S60-74338 | 4/1985 |
| JP | H02-119347 | 9/1990 |
| JP | H03-12332 | 1/1991 |
| JP | H05-190153 | 7/1993 |
| JP | H11-307049 | 11/1999 |
| JP | H11-339724 | 12/1999 |
| JP | 2000-306550 | 11/2000 |
| JP | 2001-265256 | 9/2001 |
| JP | 2002-117810 | 4/2002 |
| JP | 2003-86141 | 3/2003 |

* cited by examiner

Primary Examiner—Mariceli Santiago
Assistant Examiner—German Colón
(74) Attorney, Agent, or Firm—Staas & Halsey LLP (57) ABSTRACT

A phosphor layer is formed efficiently in a gas discharge tube by drawing a mother material to fabricate a supporting member which is insertable in a small glass tube used for a gas discharge tube, forming a phosphor layer on the supporting member, and inserting and placing the supporting member in the small glass tube.

11 Claims, 13 Drawing Sheets

FIG. 15

METHOD FOR FORMING PHOSPHOR LAYER OF GAS DISCHARGE TUBE AND METHOD FOR FABRICATING PHOSPHOR LAYER SUPPORTING MEMBER

This application is a continuing application, filed under 35 U.S.C. §111 (a), of International Application PCT/JP02/09385, filed Sep. 12, 2002, it being further noted that foreign priority benefit is based upon Japanese Patent Application 2001-280187, filed Sep. 14, 2001.

TECHNICAL FIELD

The present invention relates to a method for forming a phosphor layer of a gas discharge tube and a method for fabricating a phosphor layer supporting member. More particularly, the present invention relates to a method for forming a phosphor layer of a gas discharge tube comprising a small glass tube having an internal diameter of about 0.5–5 mm, and to a method for fabricating a phosphor layer supporting member which is insertable in the gas discharge tube and which has a phosphor layer formed on its surface.

BACKGROUND ART

A display device for displaying an arbitrary image is known, in which a plurality of gas discharge tubes each comprising a small glass tube having an internal diameter of about 0.5–5 mm are arranged in an array form.

In the small glass tube used as the gas discharge tube for the display device, a phosphor layer for converting ultraviolet light generated by discharge to visible light is formed. As a method for forming the phosphor layer in the small glass tube, a method of forming the phosphor layer directly on an inner wall of the small glass tube is well known. There is also a method of forming the phosphor layer on a supporting member separated from the small glass tube and then inserting it in the small glass tube as described in Japanese Patent Application No. 2001-276941 which is also an application by applicant of the present application.

When compared to the method of forming the phosphor layer directly on the inner wall of the small glass tube, the method of forming the phosphor layer in the small glass tube by inserting the supporting member having the phosphor layer formed thereon (hereafter referred to as "phosphor layer supporting member") into the small glass tube has an advantage that a uniform phosphor film can be formed easier. On the other hand, fabrication of the supporting member is not easy because the supporting member needs to be a structure which is slimmer than the small glass tube and almost the same as the small glass tube in length, and needs to have an almost the same expansion coefficient as that of the small glass tube.

For the above reasons, there has been a demand for a method for easily and efficiently fabricating the supporting member for forming the phosphor layer thereon, which is insertable in the small glass tube to be used as the gas discharge tube.

In view of the above circumstances, the present invention is directed to a method for efficiently forming a phosphor layer in a gas discharge tube by drawing a base material to fabricate a supporting member which is insertable in a small glass tube to be used as the gas discharge tube, forming a phosphor layer on the supporting member, and then inserting and placing the supporting member in the small glass tube.

DISCLOSURE OF INVENTION

The present invention provides a method for forming a phosphor layer in a gas discharge tube comprising the steps of: drawing a base material to fabricate a supporting member which is insertable in a gas discharge tube; forming a phosphor layer on a surface of the supporting member; and inserting into the gas discharge tube a phosphor layer supporting member having the phosphor layer formed thereon.

According to the present invention, the phosphor layer is formed in the gas discharge tube by drawing the base material to fabricate the supporting member which is insertable in the gas discharge tube, forming the phosphor layer on the surface of the supporting member, and inserting into the gas discharge tube the phosphor layer supporting member having the phosphor layer formed thereon. The yield of the supporting member fabricated by the method of the present invention is higher than that of the supporting member fabricated by grinding. Compared with a method of forming a phosphor layer directly on an inner wall of a gas discharge tube, the method of the present invention can easily form a uniform phosphor film. Furthermore, since the phosphor layer can be baked outside the gas discharge tube, no contamination of a discharge gas by a residue of an organic component takes place at the baking of the phosphor layer.

BEST MODE FOR CARRYING OUT THE INVENTION

In the method for forming a phosphor layer of a gas discharge tube of the present invention, the phosphor layer is formed in the gas discharge tube by, drawing a base material to fabricate a supporting member for forming a phosphor layer thereon, forming the phosphor layer on the supporting member, and inserting into the gas discharge tube a phosphor layer supporting member having the phosphor layer formed thereon. The phosphor layer supporting member to be fabricated by the present invention can be used suitably for a gas discharge tube for display comprising a small tube having a diameter of about 0.5–5 mm. The present invention provides methods for forming a phosphor layer and for fabricating a phosphor layer supporting member that are suitable for such a gas discharge tube for display as described above.

The supporting member used in the phosphor layer formation method of the present invention is fabricated as follows. As a preliminarily step, a large base material having a shape similar to an intended shape is fabricated. Then, the large base material is heated at a temperature ranging from the softening point to the operation point of the base material, and is drawn (also referred to as "redrawn"), so that the supporting member of intended size and shape is fabricated. Here, the large base material before being drawn is referred to as a mother material. The shape of the mother material does not have to be similar to the shape of the gas discharge tube. However, for arranging the supporting member steadily along an inner wall of the gas discharge tube, the shape of the mother material preferably is similar to the shape of the gas discharge tube. In other words, when the gas discharge tube has the shape of a right circular, oval or rectangular cylinder, the mother material preferably has the shape of a canoe with an almost arc-shaped cross section or of a boat whose cross section is a part of a rectangle obtained by cutting the right circular, oval or rectangular cylinder vertically into half.

In the present invention, the supporting member of intended size and shape is fabricated by drawing the mother material as described above. Therefore, there is no glass grinding step, and glass is free from chipping. The mother material can be formed by various methods and can be made with high accuracy in size because it is sufficiently large in size and thickness. Besides, no large equipment is required.

According to the present invention, slight chipping of edges of the mother material which occurs during its formation can be made inconspicuous by the drawing of the mother material and softening during the drawing. Thus, the present invention has such an advantage that the supporting member is hard to be broken by handling during the phosphor layer formation step.

The supporting member of the present invention can be fabricated using various materials. As such materials, both insulating and conductive materials can be used. As the insulating material, a glass material such as low-melting glass, soda lime glass, borosilicate glass or the like, or metal oxide may be used. As the conductive material, aluminum, copper, silver, stainless steel, Alloy 426 or the like may be used.

Any of these materials may be used as a material for the supporting member. However, taking into consideration that a heat treatment may be performed after the phosphor layer supporting member is inserted and placed in the gas discharge tube, the material is preferably equal to the gas discharge tube in thermal expansion coefficient. In view of the above, it is preferable that the same material is used for the gas discharge tube and the supporting member. In the case where a metal material is used for the supporting member and the gas discharge tube is made of, for example, soda lime glass, the metal material preferably is Alloy 426 which is almost equal to the soda lime glass in thermal expansion coefficient.

In the case where the supporting member is fabricated using the metal material, the supporting member can be used as a reflecting layer for phosphors or as a signal electrode (also referred to as data electrode) for pixel selection. When using the supporting member as the signal electrode, aluminum having a comparatively high conductivity is preferably used as the metal material.

Even if the metal material is adopted for the supporting member, it is difficult to fabricate such a supporting member insertable inside the gas discharge tube directly by forming a thin metal material. Accordingly, in the case where the metal material is used, the metal supporting member is fabricated by elongation at room temperature, utilizing the characteristics of the metal material.

When using the metal material, the supporting member may be fabricated by deforming the metal material to a desirable shape by roll-forming or press-forming simultaneously with or after the elongation. Alternatively, the supporting member may be fabricated by elongating the metal material of round bar shape until it takes the shape of a fine wire having a uniform diameter, and press-forming the wire with a mold.

When fabricating the supporting member by press forming, the material is preferably held under longitudinal tension while being pressed so that a straight supporting member is formed.

Such forming of the metal material as described above can be applied to materials such as glass, low-melting glass and metal oxides as well. The supporting member can also be fabricated by processing these materials by applying pressure while heating.

In the present invention, in the case where the glass material is used for the mother material, the mother material is heated at a temperature in the range of its softening point to operation point when drawing the mother material.

Figure 1:
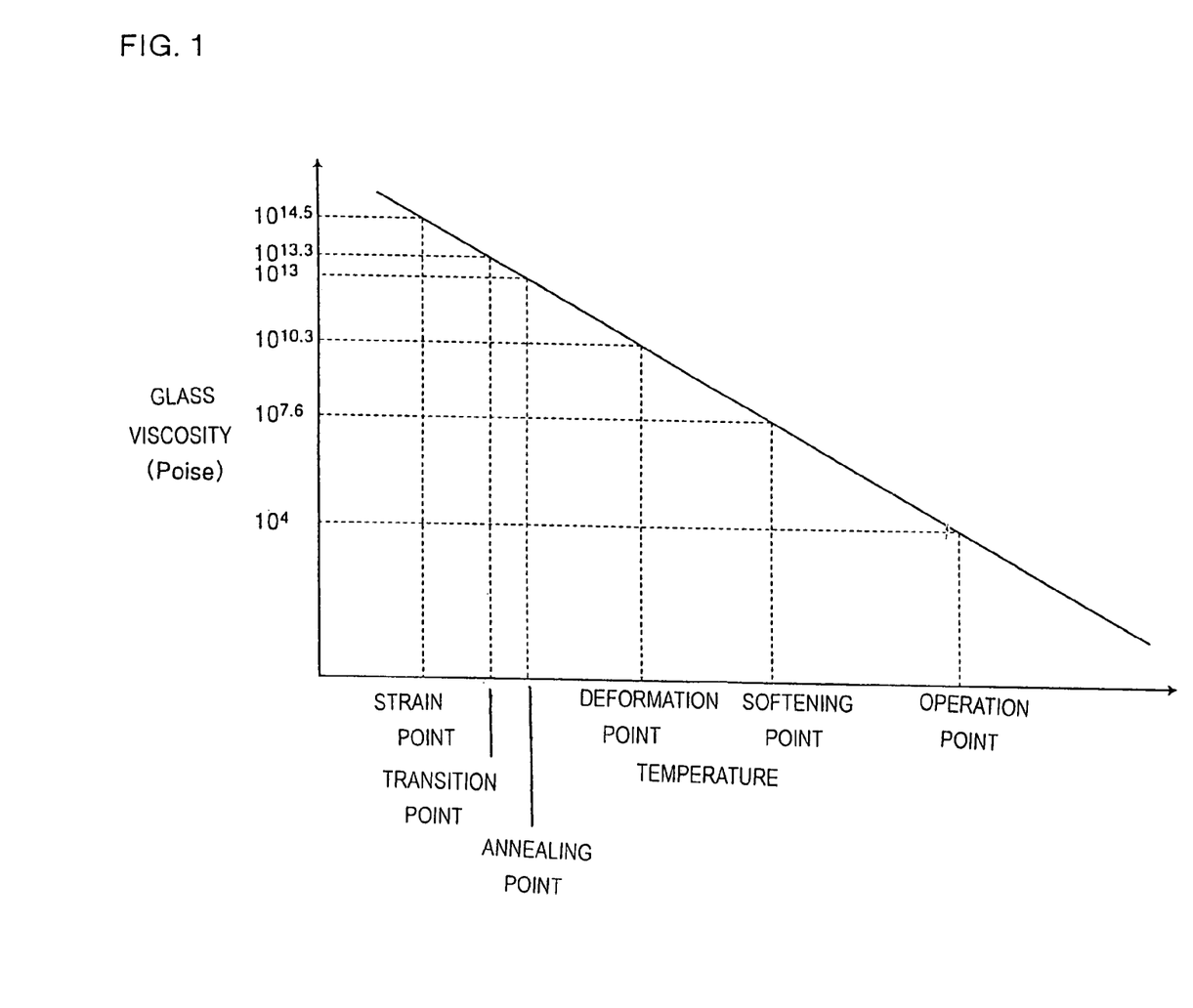
FIG. 1 is a graph representing a relationship between a heating temperature and a glass viscosity when borosilicate glass is used as a glass material.

FIG. 1 is a graph representing a relationship between a heating temperature and a glass viscosity when borosilicate glass is used as the glass material. In the case of borosilicate glass, its softening point is about 600–800° C. and its operation point is about 800–1,200° C. Forming at a temperature in the range of the softening point to the operation point allows the glass viscosity to be maintained in the range of $10^{4}$–$10^{7.6}$ poise and deformation by decrease in viscosity during forming to be prevented.

Conventionally, as a method for fabricating the small tube, a method of drawing a cylindrical tube having a shape similar to an intended shape at a temperature not lowered than its softening point is known. A tubular structure such as the cylindrical tube can be formed by heating a material for the structure to a considerably high temperature with no concern for deformation since radial tension put on the structure during softening is uniform.

However, in the case of the supporting member of the present invention whose cross section is not symmetric with respect to a point, the range of temperature for forming needs to be strictly controlled. This is because tension on the member is not uniform during softening, and deformation occurs. As described above, when the temperature during forming is too high, the viscosity of the material decreases and a remarkable deformation occurs. Therefore, drawing of the supporting member is performed at a temperature in the range of its softening point to operation point for fabrication thereof.

In the present invention, after the supporting member insertable in the gas discharge tube is fabricated by drawing the mother material, the phosphor layer is preferably formed sequentially in line on a surface of the supporting member. In the formation of the phosphor layer, first of all, a phosphor paste is applied on the surface of the supporting member. The application of the phosphor paste may be performed by printing the phosphor paste adjusted to have a viscosity similar to that of ink by means of a printing method. Alternatively, the application may be performed by discharging the phosphor paste adjusted to have a viscosity little softer than that of ink from a nozzle of a dispenser. The phosphor paste is not particularly limited and any known phosphor paste may be used.

After the phosphor paste is applied, it is dried and baked. The baking is preferably carried out at a temperature in the range of about 350–450° C. The baking burns off a solvent and a binder resin contained in the phosphor paste to form the phosphor layer. Thus, the phosphor layer is formed on the supporting member. For the drying and baking step, conventional drying and baking steps may be adopted.

With reference to the attached drawings, the present invention will hereinafter be described by way of embodiments thereof. However, it should be understood that the invention is not limited to these embodiments and various modifications can be made.

A method for forming a phosphor layer of a gas discharge tube according to the present invention may suitably be used for a gas discharge tube for display formed of a small tube having a diameter of about 0.5–5 mm. For this reason, an example of a display device using the preceding gas discharge tube will be described below.

Figure 2:
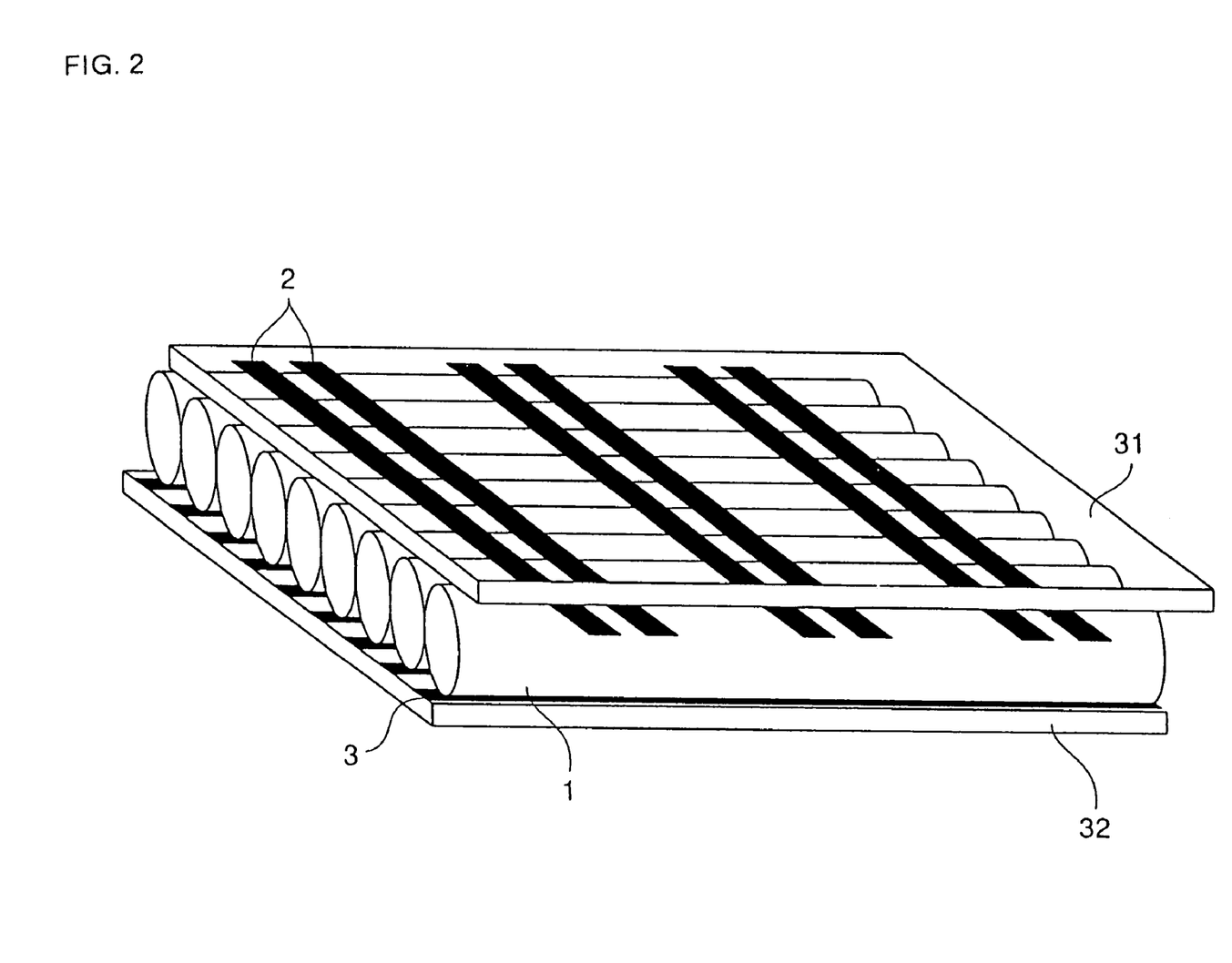
FIG. 2 is a view illustrating an example of a display device that uses a gas discharge tube in which a phosphor layer is formed by a method of the present invention.

FIG. 2 is a view illustrating an example of the display device that uses the gas discharge tube in which a phosphor layer is formed by the method of the present invention.

In the drawing, the reference numeral 1 denotes a plurality of said gas discharge tubes, 2 denotes pairs of display electrodes (pairs of main electrodes), 3 denotes signal electrodes, 31 denotes a front side substrate, and 32 denotes a rear side substrate.

A supporting member having the phosphor layer formed thereon is inserted and placed inside (discharge space) the respective gas discharge tubes 1 in small tube shape into which a discharge gas is then introduced, and both ends of the tubes are sealed. The signal electrodes 3 are formed on an inner surface of the rear side substrate 32 so as to be provided along the longitudinal direction of the gas discharge tubes 1. The pairs of display electrodes 2 are formed on an inner surface of the front side substrate 31 so as to be provided in a direction horizontally crossing the signal electrodes 3. An interval (non-discharge gap) serving as a non-discharge area is provided between each pair of display electrodes 2.

The signal electrodes 3 and the pairs of display electrodes 2 are brought into close contact with a lower outer periphery and an upper outer periphery, respectively, of the gas discharge tubes 1 during assembly. In order to improve adhesion, a conductive adhesive may be sandwiched between the display electrodes and surfaces of gas discharge tubes.

When the display device is seen in a plan view, a portion where each signal electrode 3 and each pair of display electrodes 2 cross each other serves as a unit light-emitting area. Display is performed by using one of the display electrodes 2 in a pair as a scanning electrode for generating a selective discharge at a portion where the scanning electrode and the signal electrode 3 cross each other and thereby selecting a light-emitting area. Thereafter, a display discharge is generated with the pair of display electrodes 2 by using wall charges formed by the selective discharge on an inner surface of the discharge tube at the selected light-emitting area. The selective discharge is a counter discharge generated in the gas discharge tube 1 between the scanning electrode and the signal electrode 3 that are opposite to each other in a vertical direction. The display discharge is a surface discharge generated in the gas discharge tube 1 between the display electrodes in a pair arranged parallel to each other on a plane.

In such a display device having the gas discharge tubes arranged in parallel, the display electrodes and the signal electrode may be formed on an outer surface of the gas discharge tube 1 by printing, vapor deposition or the like, so that the display electrodes form a dot pattern on the tube surface and the signal electrodes form a stripe pattern on the substrate. Then, feeding electrodes may be formed on the front side substrate 31 and the rear side substrate 32, and may be brought into contact with the display electrodes 2 and the signal electrodes 3 of the gas discharge tube 1 at the time of assembly.

Figure 3:
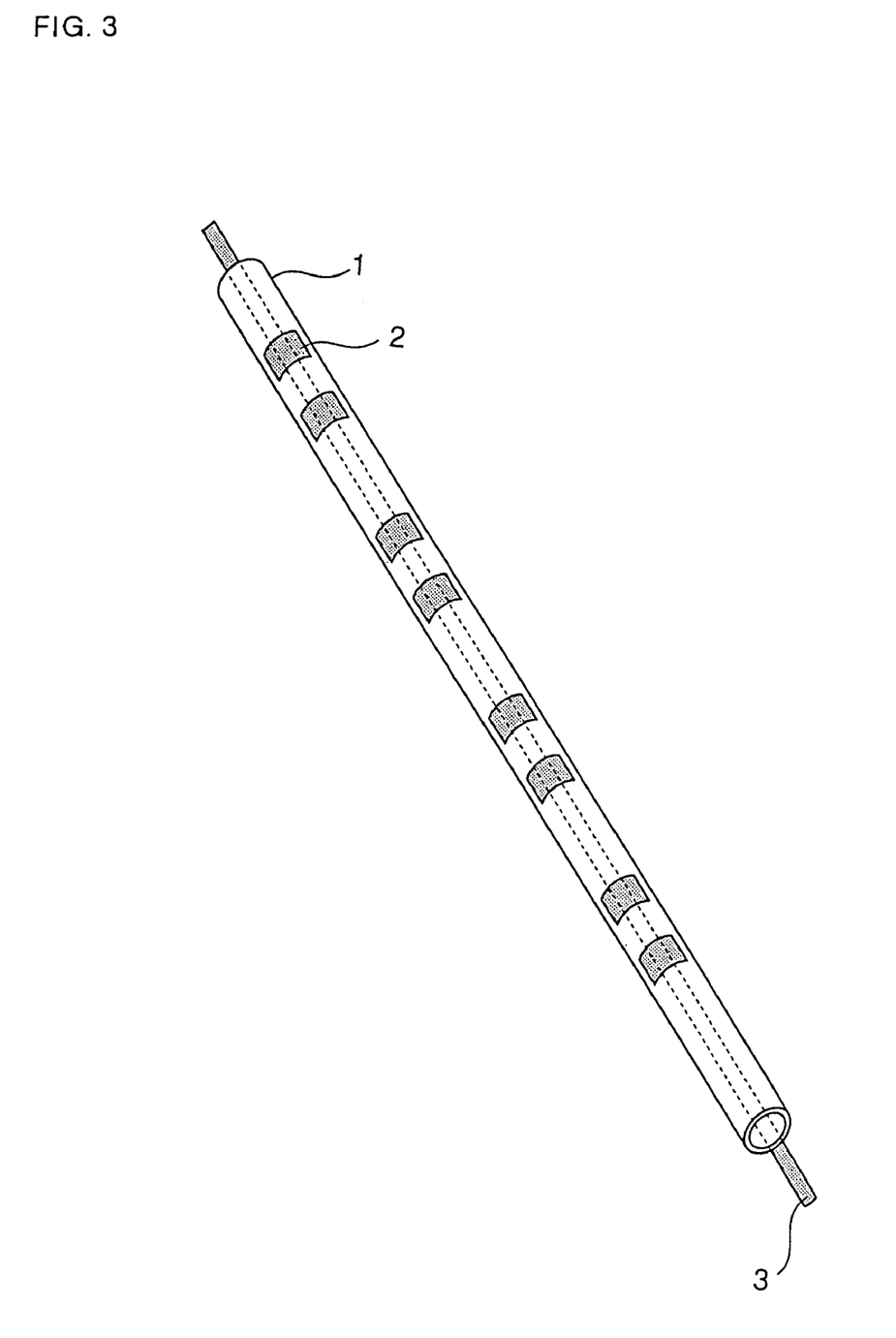
FIG. 3 is a view illustrating an example of a gas discharge tube that has display electrode pairs in dot pattern and one of signal electrodes in stripe pattern formed on a tube surface.

FIG. 3 is a view illustrating an example of the gas discharge tube that has the display electrodes in dot pattern and one of the signal electrodes in stripe pattern formed on the tube surface.

Figure 4:
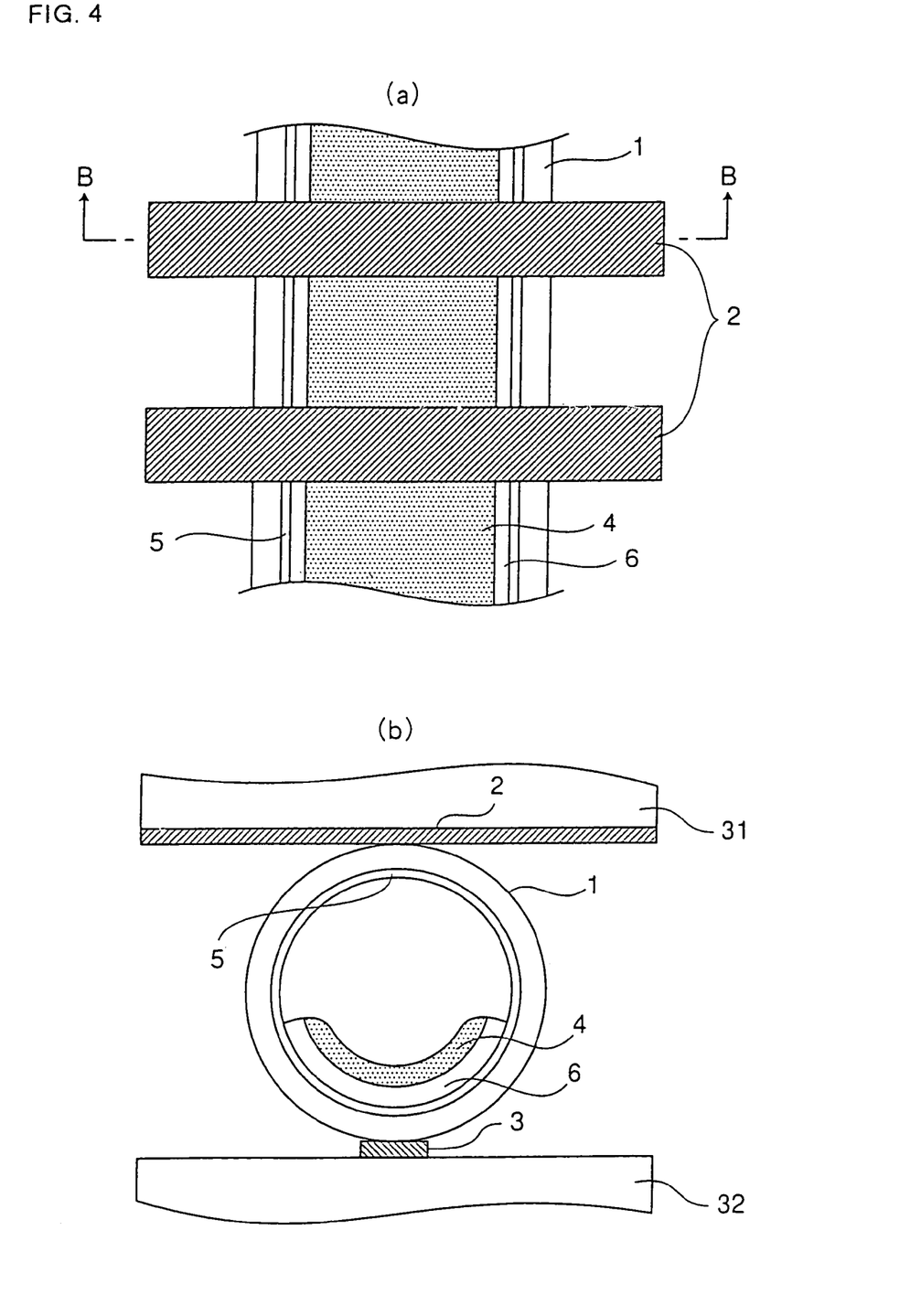
FIGS. 4(a) and 4(b) are views illustrating the internal construction of a gas discharge tube.

FIG. 4 is views illustrating the internal construction of the gas discharge tube. FIG. 4(a) is a plan view showing a part of the gas discharge tube close to the display electrodes, and FIG. 4(b) is a sectional view taken along the line B—B of FIG. 4(a). In the figures, the reference numeral 4 denotes the phosphor layer, 5 denotes a secondary electron emission film comprising MgO, and 6 denotes the supporting member. The supporting member 6 is provided for introducing the phosphor layer 4 in the gas discharge tube 1 and steadily supporting it inside the tube.

As described above, the gas discharge tube of the present invention is constructed to have a number of light-emitting points (display portions) in one tube by allowing the phosphor layer to emit light by discharge of the pairs of display electrodes which are disposed so as to be in contact with the outer wall of the tube. The gas discharge tube is made of a transparent insulator (borosilicate glass) and has a diameter of 2 mm or smaller and a length of 300 mm or greater.

The supporting member 6 is made of borosilicate glass and is separated from a tubular body (glass tube) of the gas discharge tube 1. The supporting member 6 has the phosphor layer 4 formed thereon. In other words, the phosphor paste may be applied on the supporting member 6, and then the paste may be baked to form the phosphor layer 4 on the supporting member. Thereafter, the supporting member 6 may be inserted and placed in the glass tube. Various phosphor pastes known in the art can be used as the phosphor paste.

The pair of display electrodes 2 and the signal electrode 3 can generate discharge in the discharge gas inside the tube by application of a voltage to these electrodes. In the electrode structure shown in the figures, three electrodes are arranged at one light-emitting portion and the display discharge is generated by the pair of display electrodes. However, the electrode structure is not limited to the above and the display discharge may be generated between the signal electrode 3 and either one of the display electrodes 2 in a pair.

In other words, the electrode structure may be such that the pair of display electrodes serves as a single display electrode and the single display electrode is used as the scanning electrode so that the selective discharge and display discharge (counter discharge) are generated between the signal electrode 3 and the scanning electrode.

The secondary electron emission film 5 generates electrons by collision with the discharge gas having energy of a certain value or greater. The secondary electron emission film 5 is not necessarily be provided.

When a voltage is applied to the pair of display electrodes, the discharge gas filled inside the tube is excited. The phosphor layer 4 emits visible light with vacuum ultraviolet light generated during a deexcitation process of excited inert gas atoms.

Figure 5:
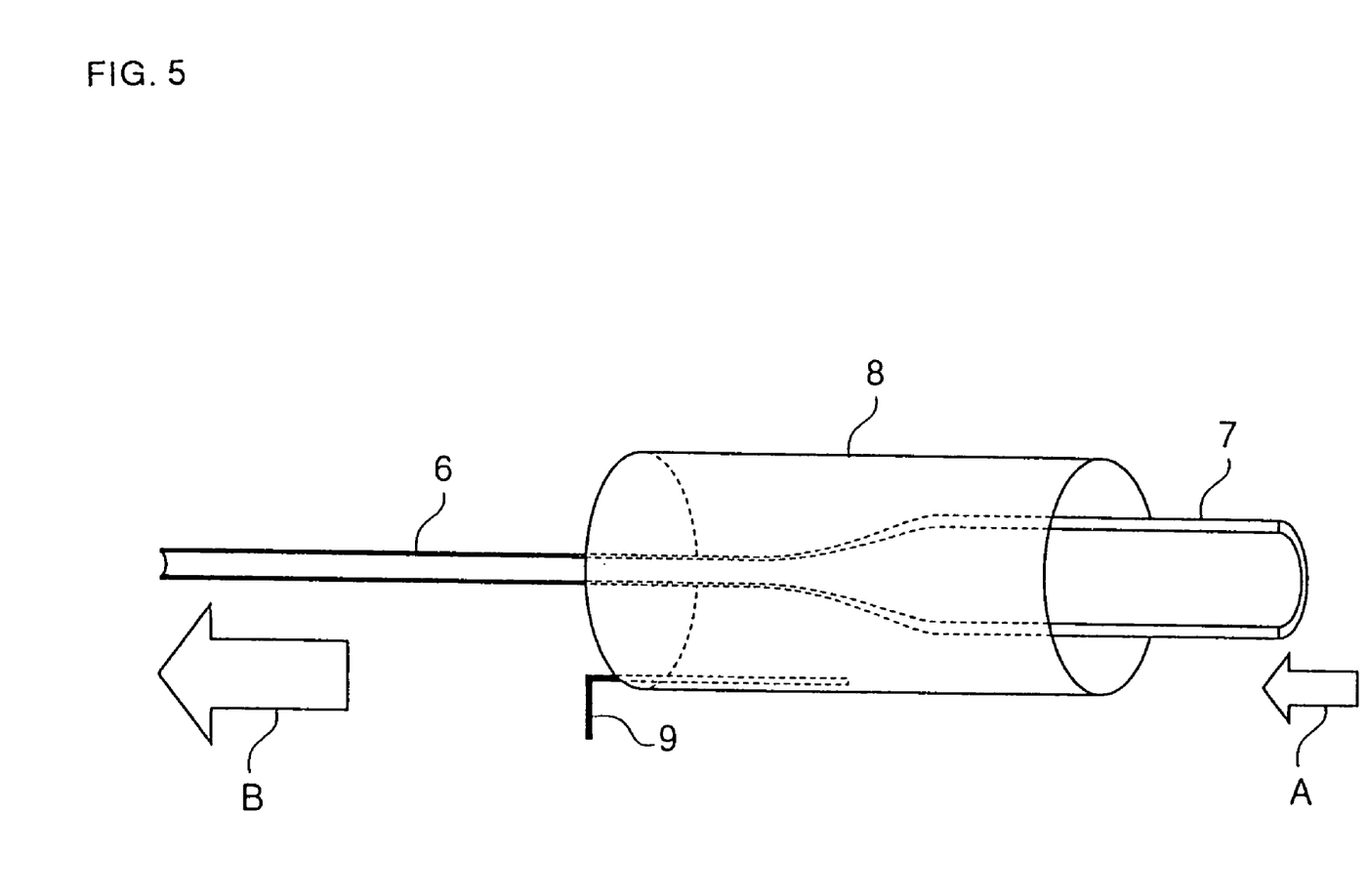
FIG. 5 is a diagram for explaining a method for fabricating a supporting member of the present invention.

FIG. 5 is a diagram for explaining a method for fabricating the supporting member of the present invention.

In fabrication of the supporting member for forming the phosphor layer thereon, as a preliminarily step, a large supporting member having the shape of a canoe (here, referred to as the shape of a boat) is fabricated using borosilicate glass as a material. The boat-shaped supporting member is obtained by cutting vertically into half a cylindrical tube whose shape is similar to an intended shape. The large supporting member thus fabricated is called a glass mother material.

Then, as shown in the figure, the supporting member 6 having an intended size and shape is fabricated by heating the glass mother material 7 with a heater 8 and redrawing the material while maintaining its shape. The heater 8 is provided with a temperature sensor 9 comprising a thermocouple and the temperature sensor 9 detects the temperature of the heater 8.

The heater 8 controls the temperature in the range of 600° C. to 1200° C., that is, from the softening point to the operation point of borosilicate glass.

The glass mother material 7 is conveyed at a speed of v in the direction of an arrow A in the figure. The supporting member 6 is pulled at a speed of [c(constant)×v] in the direction of an arrow B in the figure. The constant c is set suitably according to the material and size adopted for the mother material.

Figure 6:
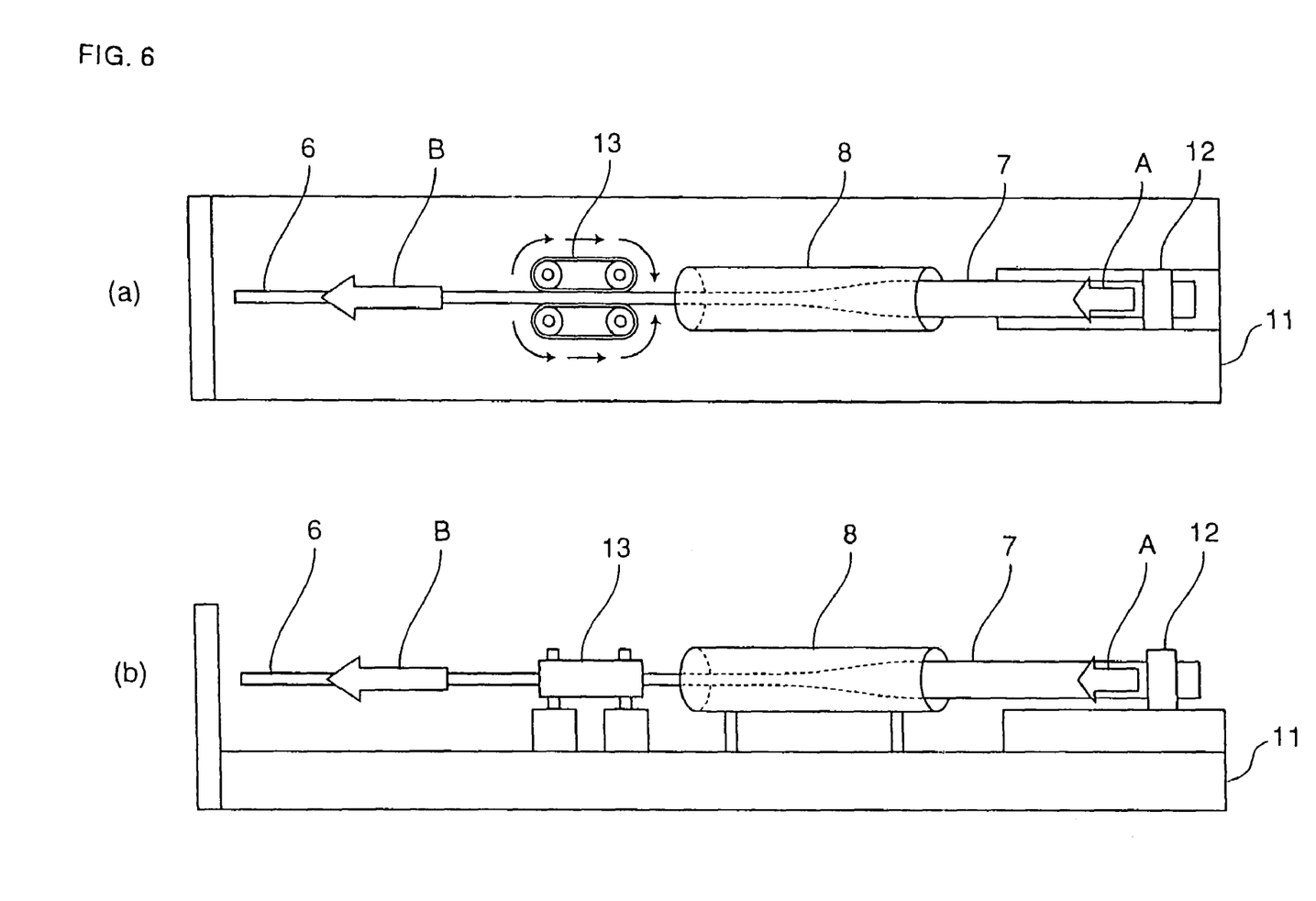
FIGS. 6(a) and 6(b) are views illustrating a general construction of a redraw apparatus.

FIG. 6 is views illustrating a general construction of a redraw apparatus. FIG. 6(a) is a view illustrating the redraw apparatus as seen from the front and FIG. 6(b) is a view illustrating the redraw apparatus as seen from the side. The redraw apparatus can be vertically oriented or horizontally oriented.

In the figure, the reference numeral 11 denotes the redraw apparatus, 12 denotes a slider, and 13 denotes a pair of drawing rolls. As described above, the slider 12 allows the glass mother material 7 to be conveyed at a speed of v, and the drawing rolls 13 draw the supporting member 6 at a speed of cv.

Figure 7:
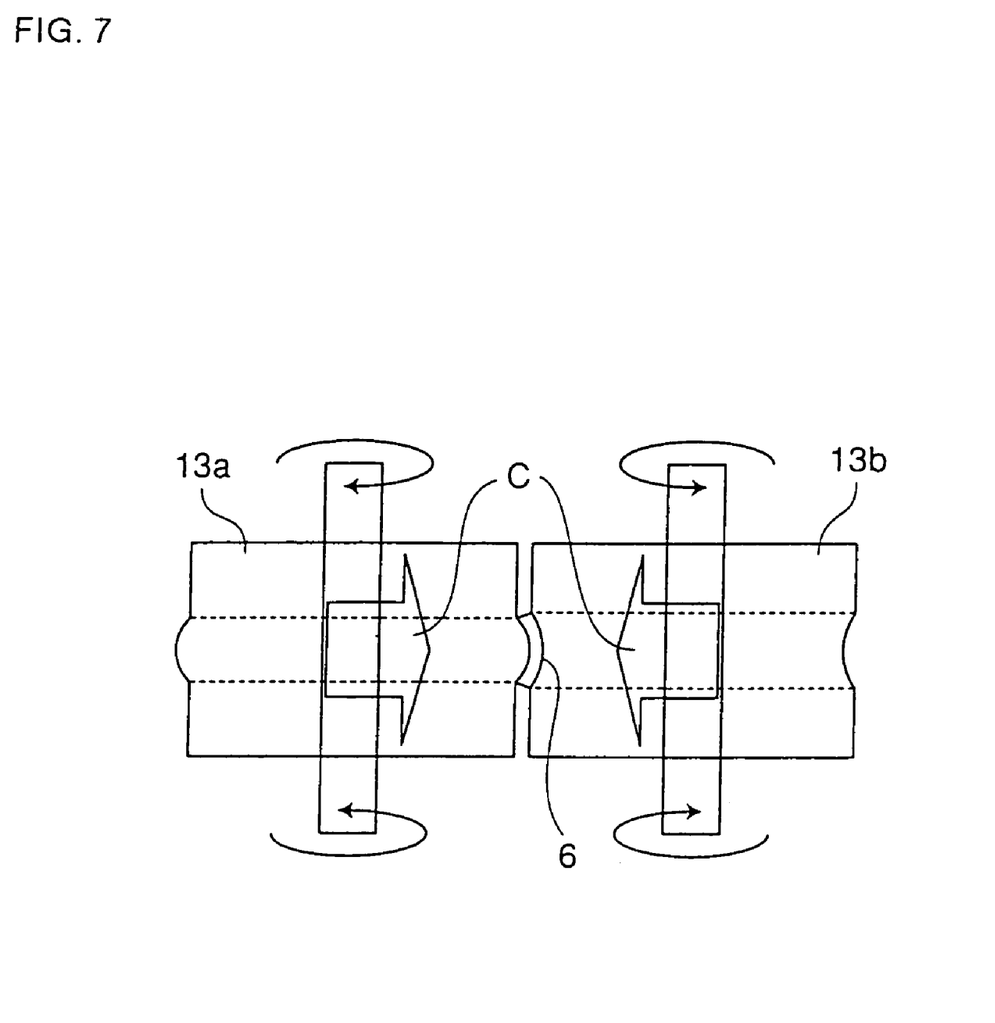
FIG. 7 is a view illustrating details of a drawing rolls.

FIG. 7 is a view illustrating details of the drawing rolls.

The glass mother material 7 is horizontally oriented with respect to the redraw apparatus. The pair of drawing rolls 13 comprises a convex roll 13a and a concave roll 13b. A portion where the convex roll 13a and concave roll 13b contact each other has the shape that corresponds to the shape of the supporting member 6. The pair of drawing rolls 13 may be flat rolls.

When the supporting member 6 is drawn by the pair of drawing rolls 13, the supporting member 6 is kept horizontally oriented and drawn while pressure is applied in the direction of an arrow C.

Figure 8:
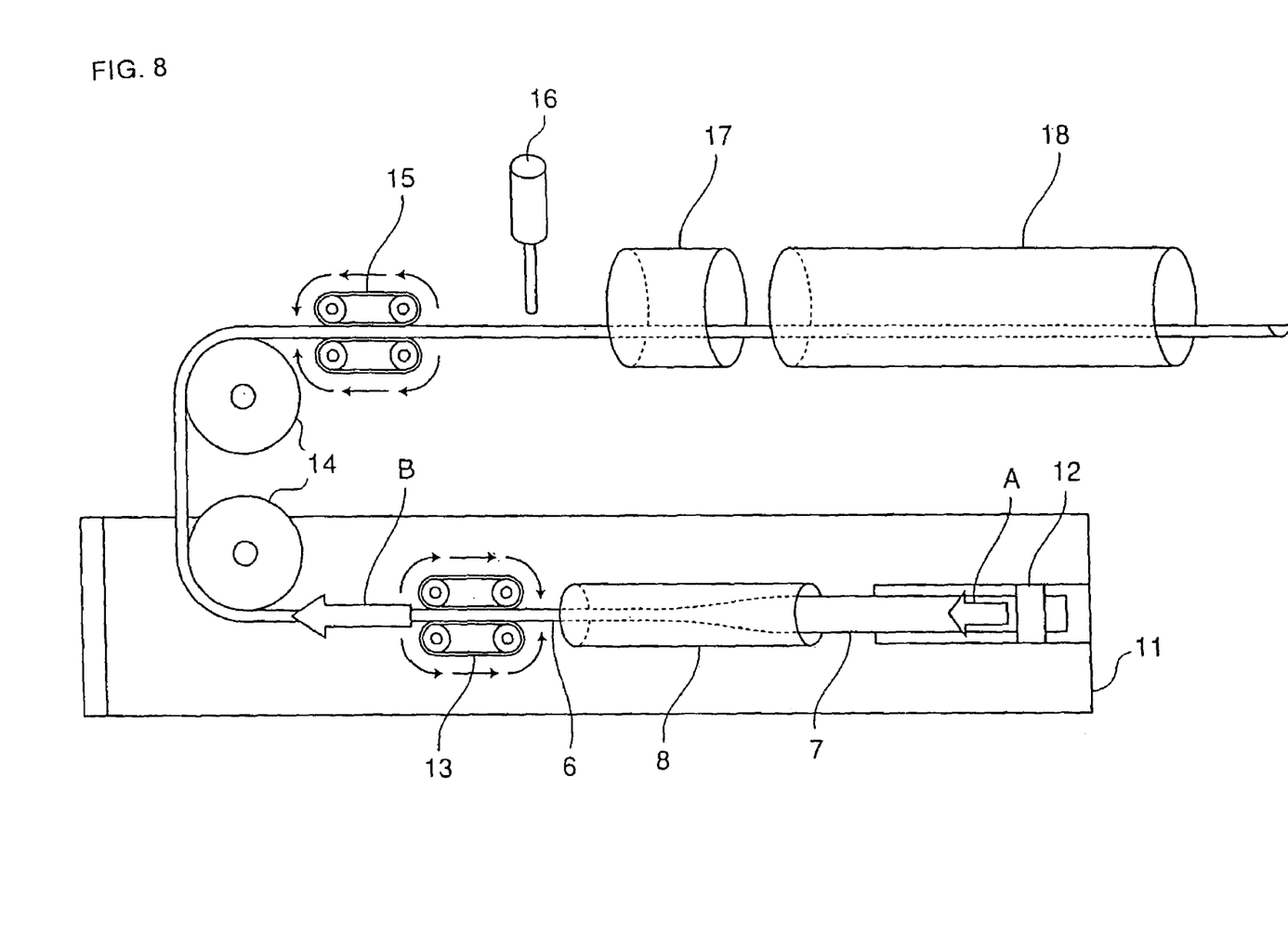
FIG. 8 is a view illustrating one embodiment of a step of forming a phosphor layer on a supporting member.

FIG. 8 is a view illustrating one embodiment of a step of forming the phosphor layer on the supporting member. In the figure, 14 denotes rolls for changing direction, 15 denotes a pair of conveying rolls, 16 denotes a phosphor paste application device, 17 denotes a drying oven, and 18 denotes a baking oven comprising a conveyor oven. In the figure, the redraw apparatus is horizontally oriented.

The pair of conveying rolls 15 comprises a convex roll and a concave roll as in the case of the pair of drawing rolls 13. A dispenser is used as the phosphor paste application device 16. The pair of conveying rolls 15 may be flat rolls as well.

In the process of this embodiment, after the step of forming the supporting member 6, the phosphor paste is applied to the supporting member 6 using the dispenser, and the paste is then dried in the drying oven 17 and baked by being passed through the baking oven 18, whereby the phosphor layer supporting member having the phosphor layer formed thereon is fabricated. Such a fabrication process as described above can simplify the manufacturing operation since the steps of fabricating the supporting member 6 to forming the phosphor layer are performed at once in line.

Also in the process of the embodiment, after the supporting member 6 is formed by the redraw apparatus, the phosphor paste is immediately applied to the supporting member 6 before it is completely cooled off, and the paste is then dried in the drying oven 17 right after its application. By applying the phosphor paste to the supporting member while ambient temperature is high, the phosphor paste can be dried faster and does not concentrate in the middle of the supporting member so that the phosphor layer does not become thick in the middle.

As an alternative to the dispenser, a printing device may be used as the phosphor paste application device 16.

In the above-mentioned process, the phosphor layer is formed on the supporting member before the supporting member is cut. However the supporting member may be cut into a predetermined length before the phosphor layer formation step so that the phosphor layer is formed on the cut supporting member of predetermined length.

Figure 9:
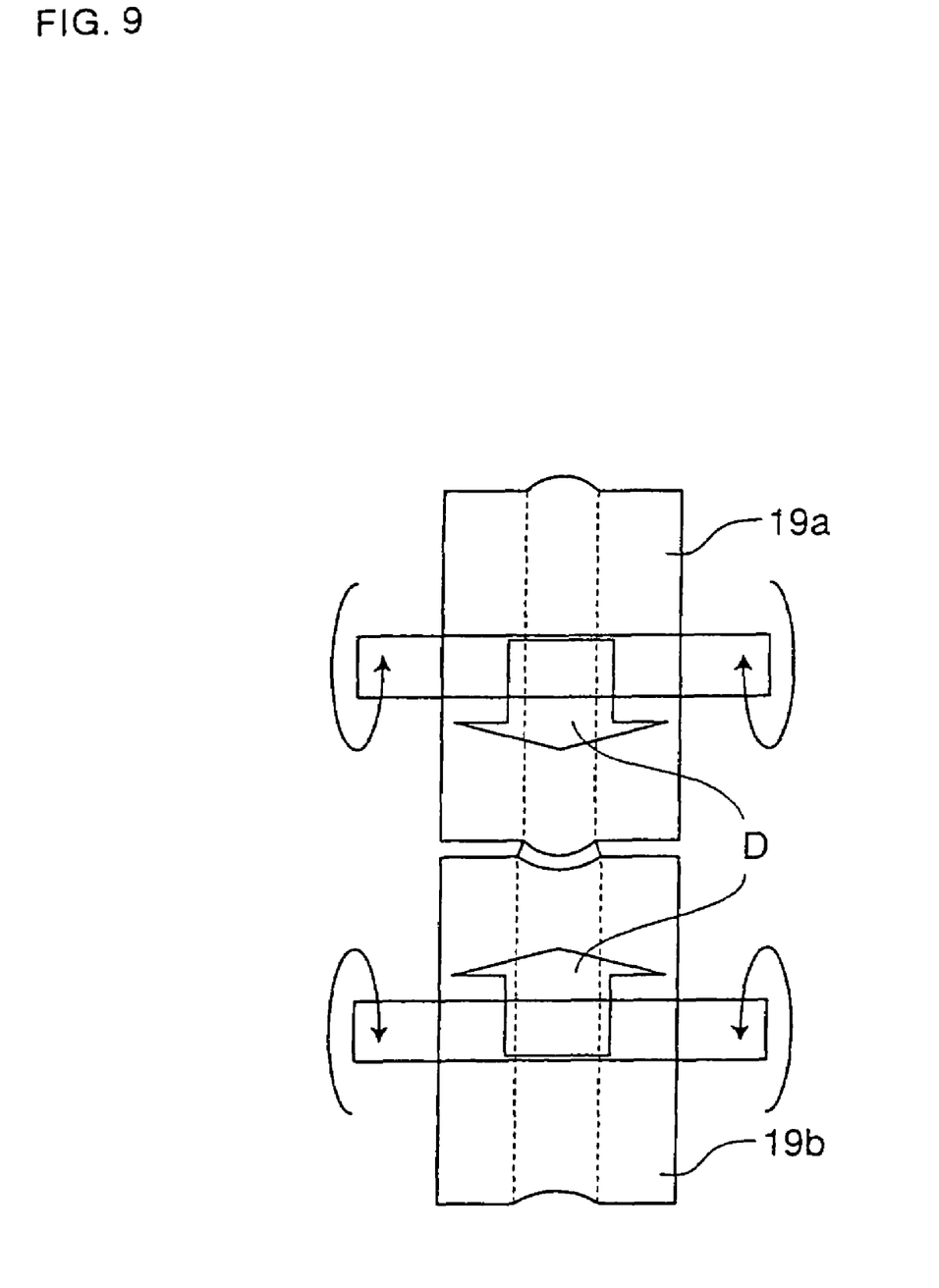
FIG. 9 is a view illustrating details of a printing device.

FIG. 9 is a view illustrating details of the printing device.

A transfer apparatus 19 in the form of rolls is used as the printing device. The transfer apparatus in roll form is constituted of a transfer roll 19a comprising a convex transfer plate and a concave opposing roll 19b. The phosphor paste can be printed continuously on the supporting member 6 by filling the phosphor paste in ink form into the transfer roll 19a and applying pressure to the transfer and opposing rolls in the direction indicated by D in the figure.

In the embodiment described above, only one redraw apparatus 11 is shown, but use of a plurality of said redraw apparatuses 11 allows mass production. For example, the phosphor layers of red (R), green (G) and blue (B) can be formed simultaneously on a plurality of said supporting members 6 for respective colors if the redraw apparatus 11 and the phosphor paste application device 16 are prepared for each color. Optionally, more than three redraw apparatuses 11 and the phosphor layer application devices 16 may be provided.

As described above, the supporting member 6 of intended size is fabricated by drawing the glass mother material 7. The glass mother material 7 can be formed by various methods and can be made with high accuracy in size because it is sufficiently large in size and thickness. Besides, no large forming equipment is required.

Slight chipping of edges of the mother material 7 which occurs during its formation can be made inconspicuous in the fabricated supporting member 6 by drawing of the mother material and softening during the drawing. Thus, the supporting member 6 has such an advantage that it is hard to be broken by handling during the phosphor layer formation step.

Besides, the viscosity of the glass mother material 7 does not decrease and deformations of the supporting member 6 such as a warp and twist do not occur since the mother material is processed at a temperature in the range of its softening point to operation point.

Figure 10:
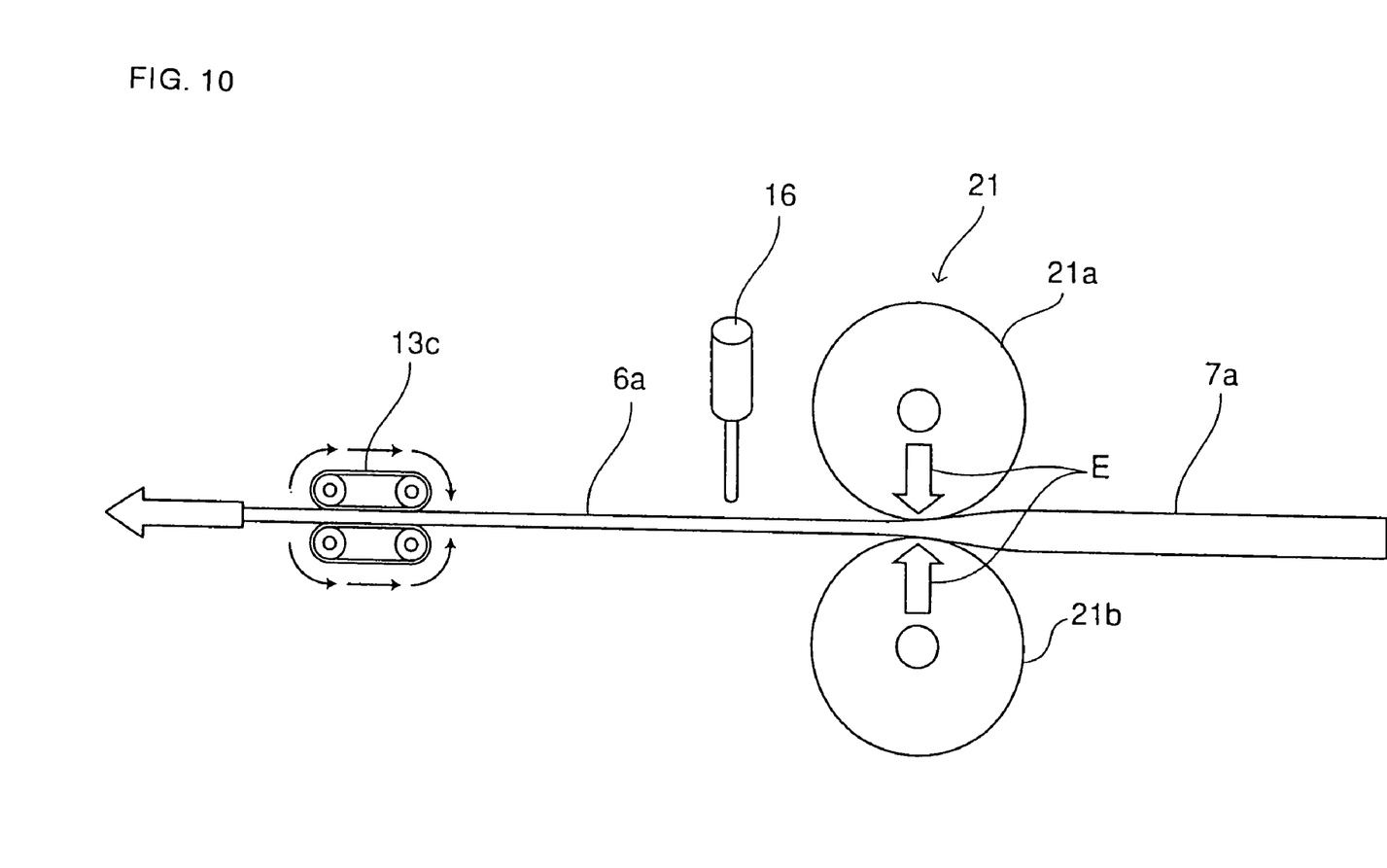
FIG. 10 is an illustrative view of an example of fabrication of a supporting member using a metal base material.

FIG. 10 is an illustrative view of an example of fabrication of the supporting member using a metal base material.

In the figure, 6a denotes a supporting member made of metal, 7a denotes a metal mother material, 13c denotes drawing rolls, and 21 denotes reduction rolls.

In this embodiment, the supporting member is fabricated by elongating the metal mother material. When the supporting member is fabricated using the metal mother material, it is possible to use the supporting member as a reflecting layer for phosphors or as a signal electrode for pixel selection. When using the supporting member as the signal electrode, aluminum having a relatively high conductivity is preferably used as a metal material.

The metal mother material 7a may be boat shaped or flat shaped. The boat-shaped metal supporting member 6a is fabricated by elongating the boat-shaped metal mother material 7a as it is or by elongating the flat-shaped metal mother material 7a while forming it.

The reduction rolls 21 comprise a top roll 21a and a bottom roll 21b. The top roll 21a has a convex surface that follows the concave of the boat shape of the metal mother material 7a. The bottom roll 21b has a concave surface that follows the convex of the boat shape of the metal mother material 7a. The supporting member 6a is formed by applying pressure to the metal mother material 7a in the direction of an arrow E in the figure and then elongating and forming the metal mother material 7a.

As the phosphor paste application device 16, the same dispenser used for the glass mother material may be used. The transfer apparatus in the form of rolls shown in FIG. 9 may be used as well.

The structure of the drawing rolls 13c for the metal mother material may be the same as that of the drawing rolls for the glass mother material except that surfaces of the rolls in contact with the supporting member 6a are made of a material for metals.

Figure 11:
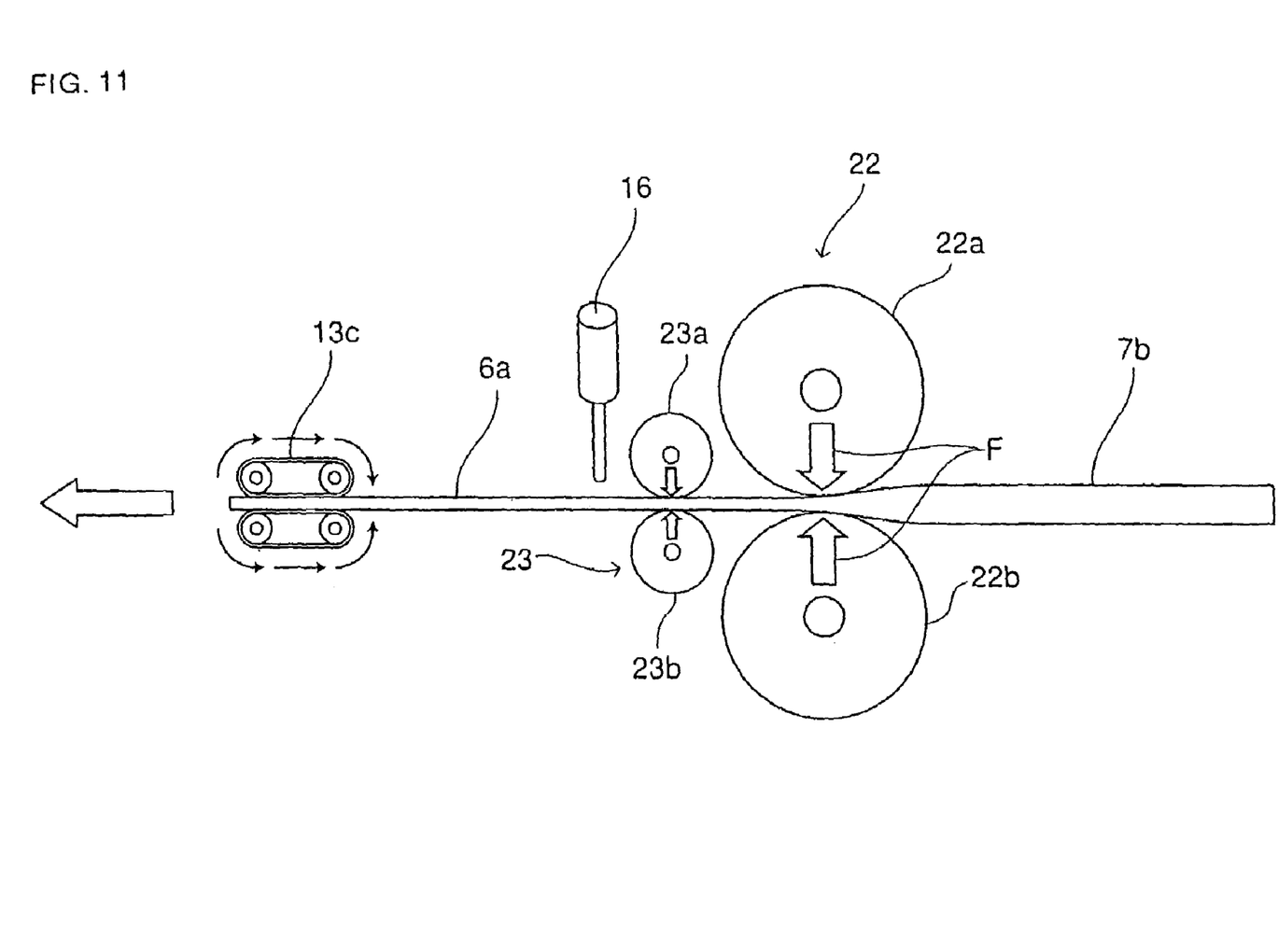
FIG. 11 is an illustrative view of an example of fabrication of a supporting member by forming a metal base material after rolling.

FIG. 11 is an illustrative view of an example of fabrication of the supporting member by forming the metal base material after rolling. In this example, rolling and forming are performed in different steps. In other words, the supporting member is fabricated by forming a metal mother material after elongation.

In the figure, 7b denotes a flat-shaped metal mother material, 22 denotes reduction rolls, and 23 denotes forming rolls. The metal mother material 7b has a flat shape. The metal supporting member 6a in boat shape is fabricated by forming the flat-shaped metal mother material 7b with the forming rolls 23 after elongation.

The reduction rolls 22 comprise a top roll 22a and a bottom roll 22b. Both the top roll 22a and the bottom roll 22b have flat surfaces that correspond to the flat shape of the metal mother material 7b. The metal mother material 7b is elongated by application of pressure thereto in the direction of an arrow F in the figure.

As the phosphor paste application device 16, the same dispenser used for the glass mother material may be used. The transfer apparatus in the form of rolls shown in FIG. 9 may be used as well.

The structure of the drawing rolls 13c for the metal mother material may be the same as that of the drawing rolls for the glass mother material except that the surfaces of the rolls in contact with the supporting member 6a are made of a material for metals.

Figure 12:
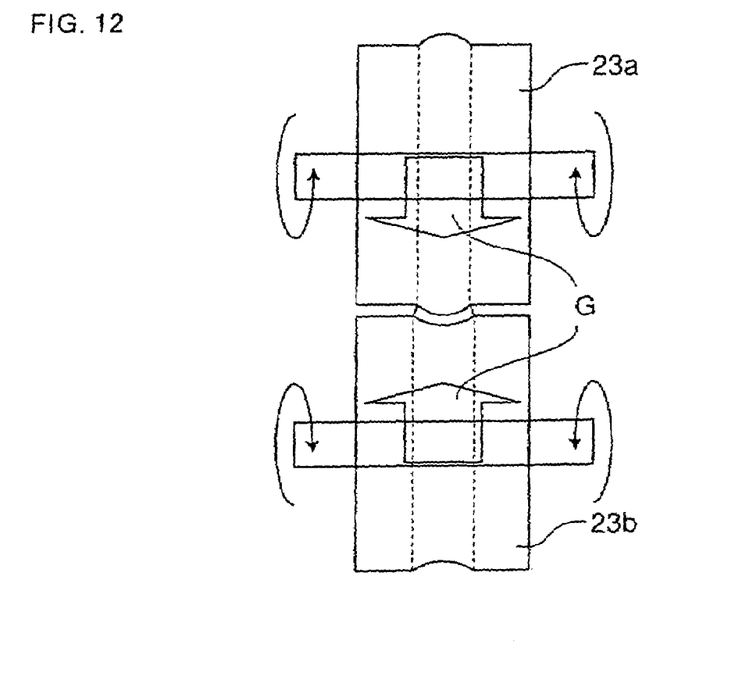
FIG. 12 is a view illustrating the configuration of a forming roll.

FIG. 12 is a view illustrating the configuration of the forming roll.

As shown in the figure, the forming rolls 23 comprise a top roll 23a and a bottom roll 23b. The top roll 23a has a convex surface that follows the concave of the boat shape of the supporting member to be formed. The bottom roll 23b has a concave surface that follows the convex of the boat shape to be formed. By applying pressure to the flat-shaped metal mother material 7b in the direction of an arrow G in the figure, the metal mother material 7b is formed into the supporting member 6a in boat shape.

Figure 13:
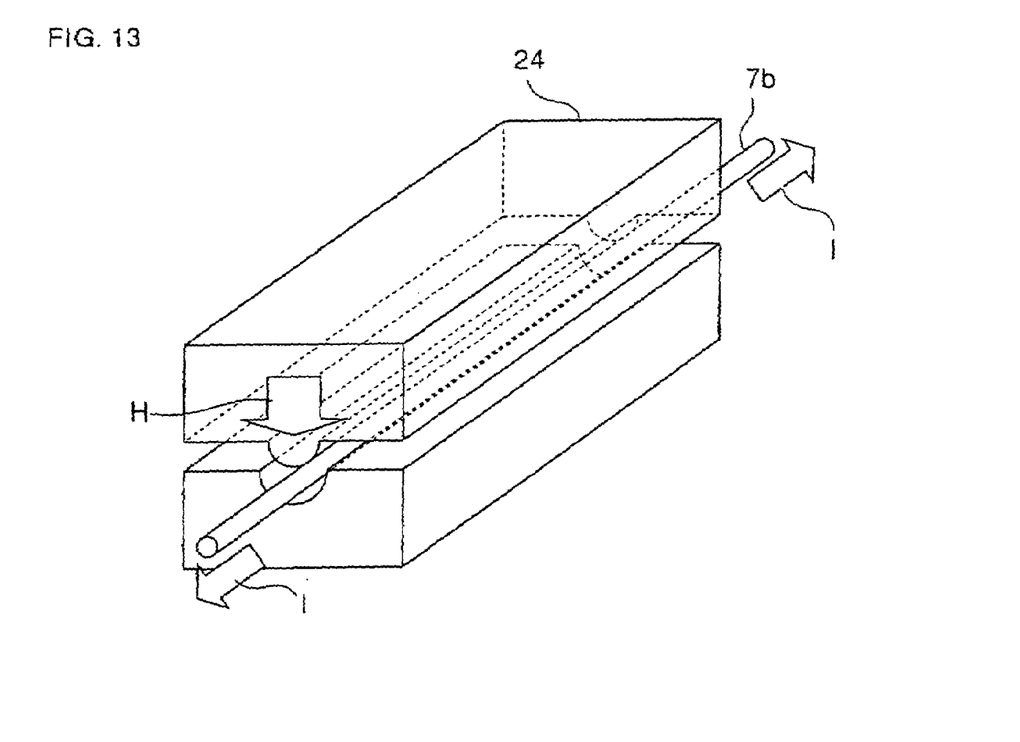
FIG. 13 is a view illustrating a step of press-forming an elongated round bar.

FIG. 13 is a view illustrating a step of press-forming an elongated round bar.

The metal mother material may be in the form of a round bar. In that case, the metal mother material is elongated by the reduction rolls while keeping its round bar shape to form the elongated mother material 7b in the form of a fine wire having a uniform diameter. Then, the elongated mother material 7b may be continuously formed by the boat-shaped forming rolls to fabricate the supporting member. Alternatively, after elongation of the mother material 7b by the reduction rolls is stopped or the elongated mother material 7b is cut to a suitable length, the elongated mother material 7b may be placed inside a press die 24 and subjected to press forming by pressing the mother material in the direction of an arrow H in the figure.

The press die 24 has a shape that corresponds to the shape of the supporting member 6a to be formed. Any pressing method such as cold pressing, heat pressing and the like may be adopted for pressing. When press-forming, the straight supporting member with no twist can be fabricated by pressing the elongated mother material 7b while maintaining tension in the longitudinal direction indicated by an arrow I in the figure.

Figure 14:
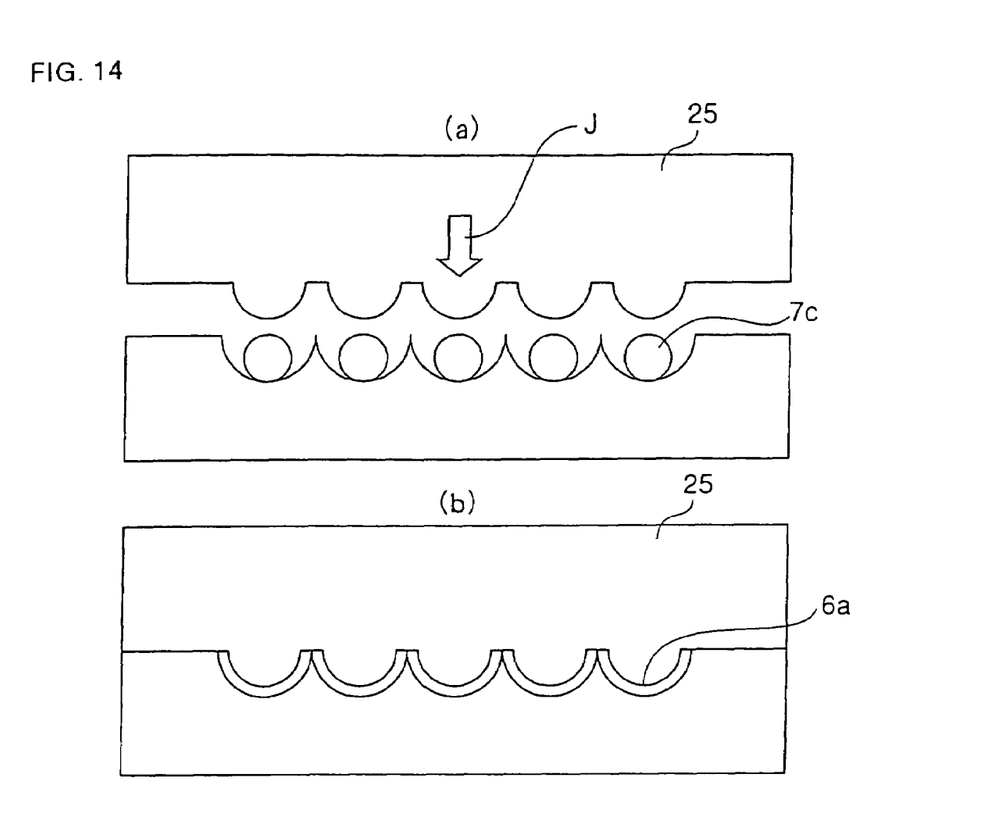
FIG. 14 is a view illustrating a case where a plurality of supporting members are formed at a time.

FIG. 14 is a view illustrating a case where a plurality of said supporting members are formed at a time.

As shown in the figure, the plurality of supporting members can be formed at a time using a press die 25 capable of simultaneously press-forming a plurality of elongated mother materials 7c in the form of fine wires. The press die 25 has a shape that corresponds to the shape of the supporting member 6a to be formed.

In the above case, the plurality of elongated mother materials 7c in the form of fine wires are placed inside the press die 25 and pressed in the direction of an arrow J in the figure (see FIG. 14(a)). This allows the plurality of supporting members 6a in boat shape to be formed at once.

In the above, the elongation and forming of the metal mother material is discussed. However, even in the case where the glass mother material is used, the supporting member can be fabricated by press-forming the mother material after heating and drawing it. When press forming the glass mother material, forming is performed by pressing the material while heating. In the forming, the mother material may be a bar-shaped material having a predetermined outer diameter. Alternatively, powder of metal oxide may be subjected to heat-press forming.

Figure 15:
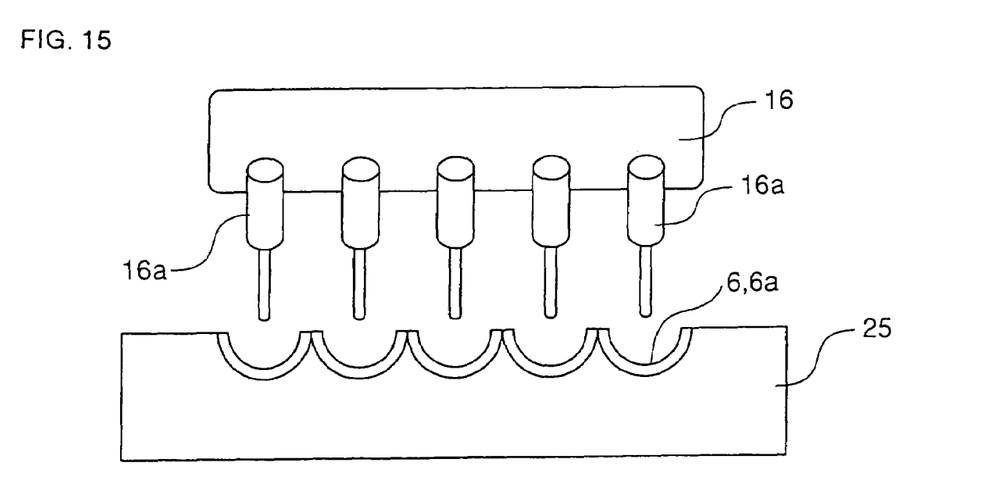
FIG. 15 is a view illustrating a case where a phosphor paste is applied to a plurality of supporting members at a time.

FIG. 15 is a view illustrating a case where the phosphor paste is applied to the plurality of supporting members at a time.

As shown in the figure, the phosphor paste may be simultaneously applied to the plurality of supporting members 6, 6a using the phosphor paste application device 16 provided with a plurality of nozzles 16a. The phosphor paste application device 16 is the dispenser shown in FIG. 8 with the plurality of nozzles 16a provided thereto. In this case, one accommodating section for phosphor paste may be provided to apply the phosphor paste of the same color, or the accommodating section may be provided for each phosphor paste of red, green and blue to apply the phosphor pastes of three colors at one time.

Instead of the phosphor paste application device 16, the transfer apparatus in the form of rolls shown in FIG. 9 may be used. In that case, the transfer apparatus in the form of rolls provided with a plurality of said transfer rolls is used. As in the above case, the phosphor paste of the same color may be printed with all the transfer rolls, or the transfer rolls may be provided for three colors of red, green and blue to print the phosphor pastes of three colors at one time.

A coating apparatus such as a slot coater which discharges the phosphor paste in slits, curtain coater or the like are also applicable.

The supporting members 6, 6a may be fabricated with any one of the glass mother material, metal mother material and metal oxide powder. The phosphor paste may be applied to the supporting members 6, 6a by the dispenser while the supporting member is kept in the press die.

When using the dispenser to apply the phosphor paste to the supporting member formed continuously by the forming rolls, the dispenser is fixed for the application of the paste while the supporting member moves. When using the dispenser to apply the phosphor paste to the supporting member formed by cutting the elongated mother material 7c and press-forming it, the dispenser moves for the application of the paste.

As described above, the supporting member is fabricated by drawing or elongation, and after that, the phosphor paste is continuously applied to the supporting member, so that the phosphor layer supporting member having the phosphor layer formed thereon can be efficiently fabricated in line.

After the phosphor layer supporting member having the phosphor layer formed thereon is fabricated, the supporting member is inserted and fixed inside the gas discharge tube to form the phosphor layer in the gas discharge tube.

According to the present invention, the supporting member insertable inside the gas discharge tube is fabricated by drawing of the mother material as described in the foregoing. Since the phosphor layer is formed in the gas discharge tube by inserting the phosphor layer supporting member having the phosphor layer formed thereon into the gas discharge tube, fabrication of the supporting member with high yield, easier formation of a uniform phosphor film and efficient formation of the phosphor layer in the gas discharge tube by a series of steps can be realized.

What is claimed is:

1. A method for forming a phosphor layer in a gas discharge tube having discharge gas introduced therein and defining a discharge space, comprising:

drawing a mother material to fabricate a supporting member which is insertable in a gas discharge tube;

forming a phosphor layer on a surface of the supporting member; and inserting into the gas discharge tube the resulting phosphor layer supporting member having the phosphor layer formed thereon.

2. The method of claim 1, wherein the fabrication step of the supporting member and the formation step of the phosphor layer are performed sequentially in-line.

3. The method of claim 1, wherein the mother material is made of glass, and the fabrication step of the supporting member from the glass mother material comprises heating and drawing of the glass mother material at a temperature ranging between the softening point and the operating point of the glass mother material.

4. The method of claim 1, wherein the mother material is made of metal and the fabrication step of the supporting member from the metal mother material comprises elongation of the metal mother material at room temperature.

5. The method of claim 4, wherein forming of the metal mother material is performed simultaneously with the elongation at room temperature.

6. The method of claim 4, further comprising the step of roll-forming or press-forming the metal mother material after the elongation at room temperature.

7. The method of claim 6, wherein the press forming is performed while longitudinal tension is placed on the metal mother material.

8. The method of claim 1, wherein the mother material is made of metal oxide or low-melting glass, the method further comprising the step of roll-forming or press-forming the mother material while heating after the drawing of the mother material.

9. The method of claim 1, further comprising:

using the glass discharge tube, having the resulting phosphor layer supporting member inserted therein, in a display device.

10. A method for fabricating a phosphor layer supporting member for supporting a phosphor layer in a gas discharge tube, comprising:

drawing a mother material having an almost arc-shaped cross section similar to an outer shape of a gas discharge tube to fabricate a supporting member, the supporting member having an almost arc-shaped cross section of a size that is insertable in the gas discharge tube so as to form a phosphor layer on an arc-shaped internal surface of the supporting member.

11. The method of claim 10, wherein the mother material is made of glass, and the fabrication of the supporting member comprises heating and drawing of the glass mother material at a temperature ranging between the softening point and the operating point of the glass mother material.

* * * * *